United States Patent
Guo et al.

(10) Patent No.: US 11,658,334 B2
(45) Date of Patent: *May 23, 2023

(54) SEPARATOR AND ELECTROCHEMICAL DEVICE

(71) Applicant: NINGDE AMPEREX TECHNOLOGY LIMITED, Ningde (CN)

(72) Inventors: KeBing Guo, Ningde (CN); DongYang Guo, Ningde (CN); GengJin Kong, Ningde (CN); XingHua Tao, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 66 days.

This patent is subject to a terminal disclaimer.

(21) Appl. No.: 17/180,496

(22) Filed: Feb. 19, 2021

(65) Prior Publication Data

US 2021/0184316 A1    Jun. 17, 2021

Related U.S. Application Data

(63) Continuation of application No. 16/202,346, filed on Nov. 28, 2018, now Pat. No. 10,964,927.

(30) Foreign Application Priority Data

Jun. 20, 2018  (CN) .......................... 201810640157.9

(51) Int. Cl.
*H01M 50/454*    (2021.01)
*H01M 10/0525*   (2010.01)
(Continued)

(52) U.S. Cl.
CPC ..... *H01M 10/0525* (2013.01); *H01M 50/414* (2021.01); *H01M 50/42* (2021.01); (Continued)

(58) Field of Classification Search
CPC ............. H01M 50/449; H01M 50/446; H01M 10/0525
See application file for complete search history.

(56) References Cited

U.S. PATENT DOCUMENTS 5,746,916 A * 5/1998 Kamo ................ B01D 67/0027
                                                210/500.39
10,964,927 B2 * 3/2021 Guo ..................... H01M 50/446
(Continued)

FOREIGN PATENT DOCUMENTS

| CN | 1447460 A | 10/2003 |
| CN | 1764688 A | 4/2006 |

(Continued)

OTHER PUBLICATIONS

Chinese First Office Action dated Mar. 13, 2020 in Chinese counterpart application 201910699671.4, 8 pages in Chinese.
(Continued)

*Primary Examiner* — Jane J Rhee
(74) *Attorney, Agent, or Firm* — Morgan, Lewis & Bockius LLP

(57) ABSTRACT

A separator including a porous substrate and a porous layer. The porous layer is disposed on a surface of the porous substrate and includes inorganic particles and a binder. The porous substrate has an absolute plastic deformation rate in a first direction ranging from about 40% to about 1800%. By using the separator provided in the present application, the safety performance of lithium ion batteries is improved.

20 Claims, 2 Drawing Sheets

(51) Int. Cl.
*H01M 50/449* (2021.01)
*H01M 50/446* (2021.01)
*H01M 50/429* (2021.01)
*H01M 50/414* (2021.01)
*H01M 50/42* (2021.01)
*H01M 50/443* (2021.01)
*H01M 50/451* (2021.01)

(52) U.S. Cl.
CPC ....... *H01M 50/429* (2021.01); *H01M 50/443* (2021.01); *H01M 50/446* (2021.01); *H01M 50/449* (2021.01); *H01M 50/451* (2021.01); *H01M 50/454* (2021.01)

(56) References Cited

U.S. PATENT DOCUMENTS

| | | |
|---|---|---|
| 2011/0311855 A1 | 12/2011 | Peng et al. |
| 2011/0318630 A1 | 12/2011 | Wakizaka et al. |
| 2014/0349169 A1 | 11/2014 | Mizuno et al. |
| 2015/0183195 A1 | 7/2015 | Jeon et al. |

FOREIGN PATENT DOCUMENTS

| | | |
|---|---|---|
| CN | 101088185 A | 12/2007 |
| CN | 101568575 A | 10/2009 |
| CN | 101616968 A | 12/2009 |
| CN | 102334215 A | 1/2012 |
| CN | 102917876 A | 2/2013 |
| CN | 103078075 A | 5/2013 |
| CN | 103531735 A | 1/2014 |
| CN | 105449140 A | 3/2016 |
| CN | 110429229 A | 11/2019 |
| EP | 3682376 A1 | 11/1995 |
| JP | WO2012124093 | 7/2014 |
| KR | 20130136149 A | 12/2013 |
| KR | 101535198 B1 | 7/2015 |
| WO | WO2011029070 A1 | 3/2011 |
| WO | WO2018038584 A1 | 3/2018 |

OTHER PUBLICATIONS

Chinese Office Action and Search Report dated Jul. 30, 2020 in Chinese counterpart application 201810640157.9, 8 pages in Chinese.
PCT International Search Report dated Apr. 24, 2020 in PCT counterpart application PCT/CN2020/073585, 5 pages.
Extended European Search Report from European Patent Office, dated Dec. 2, 2019, in corresponding European application EP 19 17 7118.7, 7 pages.
Guo, Office Action, U.S. Appl. No. 16/202,346, dated Nov. 8, 2019, 10 pgs.
Guo, Office Action, U.S. Appl. No. 16/202,346, dated Jul. 20, 2020, 9 pgs.
Guo, Final Office Action, U.S. Appl. No. 16/202,346, dated Apr. 4, 2020, 6 pgs.
Guo, Notice of Allowance, U.S. Appl. No. 16/202,346, dated Nov. 23, 2020, 5 pgs.

\* cited by examiner

SEPARATOR AND ELECTROCHEMICAL DEVICE

CROSS REFERENCE TO RELATED APPLICATIONS

This application is a continuation application of U.S. patent application Ser. No. 16/202,346, filed on Nov. 28, 2018, which claims priority to Chinese Patent Application No. 201810640157.9 filed on Jun. 20, 2018, both of which are incorporated by reference in their entirety.

TECHNICAL FIELD

The present application relates to a separator and an electrochemical device, and more particularly to a separator and an electrochemical device using the separator.

DESCRIPTION OF THE RELATED ART

At present, electrochemical devices (for example, batteries) are more and more widely used and are closely related to people's daily lives. However, the technology concerning the safety of batteries is currently underdeveloped. Occasionally, there have been safety issues where the explosion of batteries is caused by external forces puncturing the battery when in use by users. Therefore, with the popularization of batteries, users, vendors, and battery manufacturers have put forward new requirements for battery safety.

In view of this, there is a need to provide an improved electrochemical device with better safety performance, for example, a lithium ion battery.

SUMMARY OF THE INVENTION

Embodiments of the present application provide a separator and an electrochemical device using the separator to solve at least one of the problems existing in relevant art to some extent. The separator has the characteristics of high plastic deformation rate, such that when pierced by a hard object such as a steel nail, the separator around the steel nail will extend together with the steel nail, and eventually create a wrapping effect around the steel nail, thereby reducing the probability of an internal short circuit and effectively preventing fire caused by large-area short circuit inside an electrochemical device (for example, a lithium ion battery).

In an embodiment, the present application provides a separator including: a porous substrate and a porous layer, wherein the porous layer is disposed on a surface of the porous substrate, the porous layer comprises inorganic particles and a binder, and the porous substrate has an absolute plastic deformation rate in a first direction ranging from about 40% to about 1800%. In some embodiments, the porous substrate has an absolute plastic deformation rate in the first direction ranging from about 40% to about 1600%. In some other embodiments, the porous substrate has an absolute plastic deformation rate in the first direction ranging from about 40% to about 800%.

According to the embodiments of the present application, the porous substrate has an absolute plastic deformation rate in a second direction ranging from about 60% to about 1800%. In some embodiments, the porous substrate has an absolute plastic deformation rate in the second direction ranging from about 70% to about 1600%. In some other embodiments, the porous substrate has an absolute plastic deformation rate in the second direction ranging from about 70% to about 800%.

According to the embodiments of the present application, the porous substrate has a relative plastic deformation rate in the first direction ranging from about 50% to about 100%. In some embodiments, the porous substrate has a relative plastic deformation rate in the first direction ranging from about 65% to about 90%.

According to the embodiments of the present application, the porous substrate has a relative plastic deformation rate in the second direction ranging from about 60% to about 100%. In some embodiments, the porous substrate has a relative plastic deformation rate in the second direction ranging from about 75% to about 90%.

According to the embodiments of the present application, the binder comprises, but is not limited to, at least one of a vinylidene fluoride-hexafluoropropylene copolymer, a vinylidene fluoride-trichloroethylene copolymer, polymethyl methacrylate, polyacrylic acid, polyacrylate, polyacrylonitrile, polyvinyl pyrrolidone, polyvinyl acetate, an ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, an acrylonitrile-styrene-butadiene copolymer, polyvinyl alcohol, polyvinyl ether, polytetrafluoroethylene, polyhexafluoropropylene, a styrene-butadiene copolymer, and polyvinylidene fluoride.

According to the embodiments of the present application, the inorganic particles comprise, but are not limited to, at least one of alumina, silica, magnesia, titanium oxide, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate.

According to the embodiments of the present application, the porous substrate comprises a polymer film, a multilayer polymer film or a nonwoven fabric, wherein the polymer film, the multilayer polymer film or the nonwoven fabric is formed by any one or more of the following polymers: polyethylene, polypropylene, polyethylene terephthalate, polybutylene terephthalate, polyphenylene terephthamide, polyester, polyacetal, polyamide, polycarbonate, polyimide, polyetheretherketone, polyaryletherketone, polyetherimide, polyamideimide, polybenzimidazole, polyethersulfone, polyphenylene ether, a cyclic olefin copolymer, polyphenylene sulfide and polyethylene naphthalene.

According to the embodiments of the present application, the porous substrate has a thickness ranging from about 1 to about 40 µm. In some embodiments, the porous substrate has a thickness ranging from about 3 to about 20 µm. In some other embodiments, the porous substrate has a thickness of about 7 µm.

According to the embodiments of the present application, the porous substrate has a porosity ranging from about 10% to about 70%. In some embodiments, the porous substrate has a porosity ranging from about 15% to about 60%. In some other embodiments, the porous substrate has a porosity ranging from about 25% to about 30%.

In another embodiment, the present application provides an electrochemical device, comprising a cathode, an anode, and a separator according to the embodiments of the present application.

According to the embodiments of the present application, the electrochemical device comprises lithium ion batteries.

Additional aspects and advantages of the embodiments of the present application will be partially described and illustrated in the following description or explained by the implementation of the embodiments of this application.

BRIEF DESCRIPTION OF THE DRAWINGS

The drawings needed for describing the embodiments of the present application or the prior art will be briefly described below to facilitate the description of the embodiments of the present application. Obviously, the drawings in the following description only show some embodiments of the present application. For those skilled in the art, the drawings of other embodiments can be obtained according to the structures illustrated in the drawings without creative efforts.

EMBODIMENT OF THE PRESENT INVENTION

Figure 1:
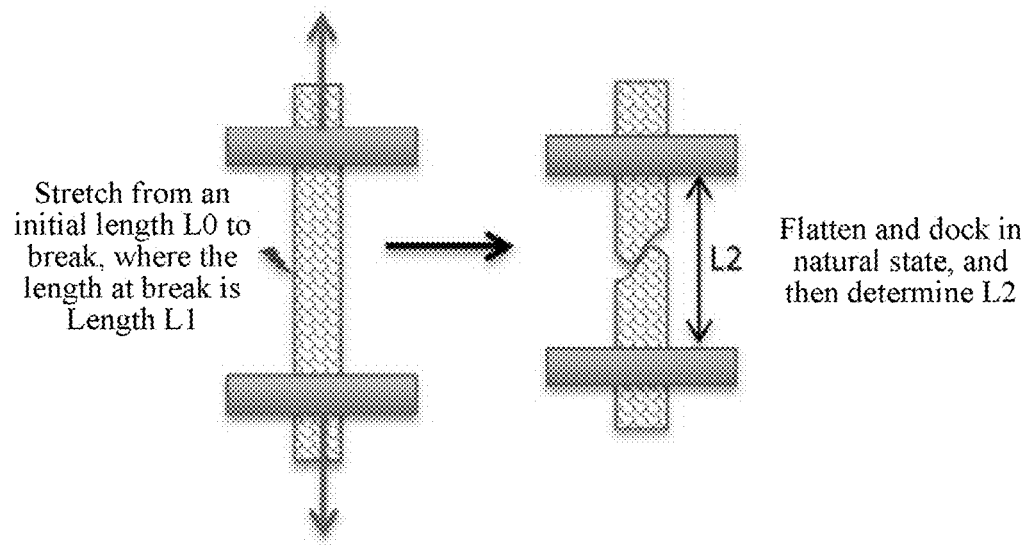
FIG. 1 is a schematic diagram of a method for testing the plastic deformation rate of a porous substrate.
Figure 2:
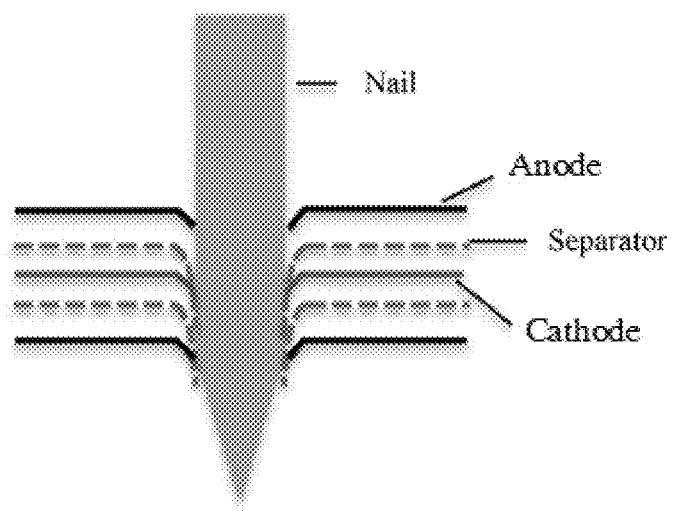
FIG. 2 is a schematic diagram showing a nail penetration process of a lithium ion battery according to an embodiment of the present application.

Embodiments of the present application will be described in detail below. In the specification of the present application, the same or similar components and components having the same or similar functions are denoted by like reference numerals. The embodiments described herein with respect to the figures are explanatory, and illustrative, and are provided to facilitate the basic understanding of the application. The embodiments of the present application should not be construed as limitations to the present application.

As used in the present application, the term "about" is used to describe and depict minor variations. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in the present application. It should be understood that such a range format is provided for the sake of convenience and simplicity, and should be understood flexibly to comprise not only the numerical values that are explicitly defined in the range, but also all the individual values or sub-ranges that are comprised in the range, as if each value and sub-range are explicitly specified.

During the use of lithium ion batteries, there is a risk of being punctured by hard objects (such as steel nails) due to improper use. Therefore, in the safety evaluation of lithium ion batteries, a nail penetration test is employed to characterize the safety of the lithium ion battery under severe operating conditions. The nail penetration test is an important means of characterizing the safety of lithium ion batteries under extreme operating conditions.

A separator acts to isolate the cathode and the anode in a lithium ion battery to prevent an internal short circuit, and acts to provide a lithium ion exchange channel inside the lithium ion battery at the same time. When a lithium ion battery is pierced by a nail, the separator will be punctured. At this time, a short-circuit area is formed around a nail hole, and fire may be more easily caused inside the lithium ion battery with the increase of the short-circuit area. When a traditional separator is punctured, a large tear hole is formed around the nail, causing large-area short circuit in the lithium ion battery, thereby causing a fire. Therefore, improving the reliability of the separator when being pierced by a nail is an effective way to improve the safety of lithium ion batteries.

For the purposes of the present application, the present application provides a separator and an electrochemical device using the separator, wherein the high plasticity of the separator is characterized by the plastic deformation rate of a porous substrate.

The plastic deformation rate of the porous substrate is tested by the method shown in FIG. 1. The length before stretching is recorded as L0; the porous substrate of a certain length and width is stretched to break at a certain rate, and the maximum length reached by the stretching is recorded as L1; and then the broken porous substrates are docked along the fracture and flattened to test the length L2 in a natural state.

The porous substrate is subjected to both elastic deformation and plastic deformation during the tensile test. The amount of elastic deformation=L1−L2, the amount of plastic deformation=L2−L0, and the total amount of deformation=the amount of elastic deformation+the amount of plastic deformation. Plastic deformation is a permanent deformation that does not bounce back. In the nail penetration test of a lithium ion battery, the greater the amount of plastic deformation of the porous substrate is, the greater the extent that the separator extends with the nail and produces permanent deformation will be, and the better the wrapping effect around the nail will be, thereby maintaining the effect of the separator in isolating the cathode and the anode, and reducing the probability of failure of lithium ion batteries. On the contrary, if the amount of elastic deformation is relatively large, even if the separator is extended during the piercing process, the separator will be greatly retracted after puncture, thereby weakening the effect of the separator in isolating the cathode and the anode.

In the present application, the porous substrate has a large plastic deformation under external force, so that when the separator is pieced by a nail, the separator will have a large extensional deformation with the nail, thereby maintaining the effect in isolating the cathodes and anodes, preventing the internal short circuit in the lithium ion battery, and improving the safety of the lithium ion battery. The absolute plastic deformation rate ε1 and the relative plastic deformation rate ε2 of the porous substrate are calculated by the following equation:

$$\varepsilon 1=(L2-L0)/L0\times 100\%$$

$$\varepsilon 2=(L2-L0)/(L1-L0)\times 100\%.$$

In various embodiments of the present application, the porous substrate has an absolute plastic deformation rate in a first direction (e.g. a longitudinal direction) ranging from about 40% to about 1800%. In some embodiments, the porous substrate has an absolute plastic deformation rate in the first direction (e.g. a longitudinal direction) ranging from about 40% to about 1600%. In various embodiments of the present application, the porous substrate has a relative plastic deformation rate in the first direction (e.g. a longitudinal direction) ranging from about 50% to about 100%. In some embodiments, the porous substrate has a relative plastic deformation rate in the first direction (e.g. a longitudinal direction) ranging from about 65% to about 90%. In various embodiments of the present application, the porous substrate has an absolute plastic deformation rate in a second direction (e.g. a transverse direction) ranging from about 60% to about 1800%. In some embodiments, the porous substrate has an absolute plastic deformation rate in the second direction (e.g. a transverse direction) ranging from about 70% to about 1600%. In various embodiments of the present application, the porous substrate has a relative plastic deformation rate in the second direction (e.g. a transverse direction) ranging from about 60% to about 100%. In some embodiments, the porous substrate has a relative plastic deformation rate in the second direction (e.g. a transverse direction) ranging from about 75% to about 90%. The porous substrate having the above properties exhibits a high plastic deformation rate, and also exhibits a high plastic deformation rate when a porous layer is provided on the surface of the porous substrate.

In various embodiments of the present application, the first direction may be any direction of the porous substrate, and the second direction is perpendicular to the first direction. In some embodiments, the first direction is a transverse direction of the porous substrate, and the second direction is a longitudinal direction of the porous substrate. In some other embodiments, the first direction is a longitudinal direction of the porous substrate, and the second direction is a transverse direction of the porous substrate.

In various embodiments of the present application, the separator comprises a porous substrate and a porous layer disposed on at least one surface of the porous substrate. The porous layer comprises a binder and inorganic particles. The binder contained in the porous layer can not only bond the inorganic particles together, but also bond the porous substrate to the porous layer to achieve integration. The binder comprises, but is not limited to, at least one of a vinylidene fluoride-hexafluoropropylene copolymer, a vinylidene fluoride-trichloroethylene copolymer, polymethyl methacrylate, polyacrylic acid, polyacrylate, polyacrylonitrile, polyvinyl pyrrolidone, polyvinyl acetate, an ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, an acrylonitrile-styrene-butadiene copolymer, polyvinyl alcohol, polyvinyl ether, polytetrafluoroethylene, polyhexafluoropropylene, a styrene-butadiene copolymer, and polyvinylidene fluoride.

The inorganic particles used in the present application are electrochemically stable, that is, they are unable to be oxidized and/or reduced within a driving voltage range (for example, 0 to 5 V based on Li/Li+) of an electrochemical device (for example, a lithium ion battery). Since inorganic particles having high-density are difficult to disperse in a coating step and may increase the weight of an electrochemical device (for example, a lithium ion battery) to be manufactured, inorganic particles having a density as low as possible are generally used. In various embodiments of the present application, the inorganic particles comprise, but are not limited to, at least one of alumina, silica, magnesia, titanium oxide, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate.

In various embodiments of the present application, the porous substrate of the separator has a thickness ranging from about 1 to about 40 μm. In some embodiments, the porous substrate of the separator has a thickness ranging from about 3 to about 20 μm. In some other embodiments, the porous substrate of the separator has a thickness of about 7 μm. According to an embodiment of the present application, when the absolute plastic deformation rate satisfies the requisite of about 40% to about 1800%, the nail penetration test passing rate increases with increasing thickness of the porous substrate.

In various embodiments of the present application, the porous substrate has a porosity ranging from about 10% to about 70%. In some embodiments, the porous substrate has a porosity ranging from about 15% to about 60%. In some other embodiments, the porous substrate has a porosity ranging from about 25% to about 30%. According to an embodiment of the present application, when the absolute plastic deformation rate satisfies the requisite of about 40% to about 1800%, the nail penetration test passing rate increases with decreasing porosity of the porous substrate.

In various embodiments of the present application, the porous substrate comprises, but is not limited to, a polymer film, a multilayer polymer film or a nonwoven fabric, wherein the polymer film, the multilayer polymer film or the nonwoven fabric is formed by any one or more of the following polymers: polyethylene, polypropylene, polyethylene terephthalate, polybutylene terephthalate, polyphenylene terephthamide, polyester, polyacetal, polyamide, polycarbonate, polyimide, polyetheretherketone, polyaryletherketone, polyetherimide, polyamideimide, polybenzimidazole, polyethersulfone, polyphenylene ether, a cyclic olefin copolymer, polyphenylene sulfide and polyethylene naphthalene.

An embodiment of the present application also provides an electrochemical device including the separator as described above, which may be a lithium ion battery. The lithium ion battery comprises a cathode containing a cathode active material layer, an anode containing an anode active material layer, an electrolyte, and a separator between the cathode and the anode, where the separator comprises a separator as described above. A cathode current collector may be an aluminum foil or a nickel foil, and an anode current collector may be a copper foil or a nickel foil.

In the above lithium ion battery, the cathode active material layer comprises a cathode material capable of absorbing and releasing lithium (Li) (hereinafter, sometimes referred to as "a cathode material capable of absorbing/releasing lithium (Li)"). Examples of the cathode material capable of absorbing/releasing lithium (Li) may comprise at least one of lithium cobalt oxide, lithium nickel cobalt manganese oxide, lithium nickel cobalt aluminum oxide, lithium manganese oxide, lithium manganese iron phosphate, lithium vanadium phosphate, lithium vanadyl phosphate, lithium iron phosphate, lithium titanium oxide or a lithium-rich manganese-based material.

In the above cathode material, the chemical formula of lithium cobalt oxide may be $Li_xCo_aM1_bO_{2-c}$, where M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) or silicon (Si), and x, a, b and c are respectively in the following ranges: $0.8 \leq x \leq 1.2$, $0.8 \leq a \leq 1$, $0 \leq b \leq 0.2$, $-0.1 \leq c \leq 0.2$.

In the above cathode material, the chemical formula of lithium nickel cobalt manganese oxide or lithium nickel cobalt aluminum oxide may be $Li_yNi_dM2_eO_{2-f}$, where M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) or silicon (Si), and y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$.

In the above cathode material, the chemical formula of lithium manganese oxide is $Li_zMn_{2-g}M3_gO_{4-h}$, where M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) or tungsten (W), and z, g and h are respectively in the range of $0.8 \leq z \leq 1.2$, $0 \leq g < 1.0$, $-0.2 \leq h \leq 0.2$.

The anode active material layer comprises an anode material capable of absorbing and releasing lithium (Li) (hereinafter, sometimes referred to as "an anode material capable of absorbing/releasing lithium (Li)"). Examples of the anode material capable of absorbing/releasing lithium (Li) may comprise carbon materials, metal compounds, oxides, sulfides, lithium nitrides such as $LiN_3$, metal lithium, and metal and polymer materials which form an alloy with lithium.

Examples of carbon materials may comprise low graphitized carbon, easily graphitizable carbon, artificial graphite, natural graphite, mesocarbon microbeads, soft carbon, hard carbon, pyrolytic carbon, coke, vitreous carbon, a sintered body of organic polymer compound, carbon fibers and activated carbon. Among them, coke may comprise pitch coke, needle coke and petroleum coke. The sintered body of organic polymer compound refers to a material obtained by calcining and carbonizing a polymer material such as a phenolic plastic or a furan resin at a suitable temperature. Some of these materials are classified into low graphitized carbon or easily graphitizable carbon. Examples of the polymer material may comprise polyacetylene and polypyrrole.

Among these anode materials capable of absorbing/releasing lithium (Li), materials whose charge and discharge voltages are close to those of metal lithium are selected. This is because the lithium ion battery tends to have a higher energy density with the decreasing of the charge and discharge voltages of the anode material. The anode material may be a carbon material because its crystal structure is only slightly changed during charging and discharging. Therefore, good cycle performance and large charge and discharge capacities can be achieved. For example, graphite is chosen because it gives a large electrochemical equivalent and a high energy density.

Further, the anode material capable of absorbing/releasing lithium (Li) may comprise elemental lithium metal, metal elements and semimetal elements capable of forming an alloy with lithium (Li), alloys and compounds including such elements, and the like. For example, they are used with a carbon material. In this case, good cycle performance and high energy density can be achieved. In addition to alloys including two or more metal elements, the alloys used herein also comprise those including one or more metal elements and one or more semimetal elements. The alloy may be in the form of a solid solution, an eutectic crystal, an intermetallic compound, and a mixture thereof.

Examples of the metal element and the semimetal element may comprise tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), ytterbium (Y) or hafnium (Hf). Examples of the above alloys and compounds may comprise a material having a chemical formula: $Ma_sMb_tLi_u$ and a material having a chemical formula: $Ma_pMc_qMd_r$. In these chemical formula, Ma denotes at least one of a metal element and a semimetal element capable of forming an alloy with lithium; Mb denotes at least one of the metal element and the semimetal element other than lithium and Ma; Mc denotes at least one of the non-metallic elements; Md represents at least one of the metal element and the semimetal element other than Ma; and s, t, u, p, q, and r satisfy $s>0$, $t \geq 0$, $u \geq 0$, $p>0$, $q>0$ and $r \geq 0$.

In addition, an inorganic compound free of lithium may be used in the anode, for example, $MnO_2$, $V_2O_5$, $V_6O_{13}$, NiS or MoS.

The lithium ion battery further comprises an electrolyte that may be one or more of a gel electrolyte, a solid electrolyte, and an electrolyte solution, where the electrolyte solution contains a lithium salt and a nonaqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, the lithium salt is $LiPF_6$, because it can give high ionic conductivity and improve the cycle performance.

The nonaqueous solvent may be a carbonate compound, a carboxylate compound, an ether compound, other organic solvents or a combination thereof.

The carbonate compound may be a chain carbonate compound, a cyclic carbonate compound, a fluorocarbonate compound or a combination thereof.

Examples of the chain carbonate compound comprise diethyl carbonate (DEC), dimethyl carbonate (DMC), dipropyl carbonate (DPC), methyl propyl carbonate (MPC), ethyl propyl carbonate (EPC), methyl ethyl carbonate (MEC) and a combination thereof. Examples of the cyclic carbonate compound comprise ethylene carbonate (EC), propylene carbonate (PC), butylene carbonate (BC), vinyl ethylene carbonate (VEC) or a combination thereof. Examples of the fluorocarbonate compound comprise fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate or a combination thereof.

Examples of the carboxylate compound comprise methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, methyl formate or a combination thereof.

Examples of the ether compound comprise dibutyl ether, tetraethylene glycol dimethyl ether, diethylene glycol dimethyl ether, 1,2-dimethoxyethane, 1,2-diethoxyethane, ethoxymethoxyethane, 2-methyltetrahydrofuran, tetrahydrofuran or a combination thereof.

Examples of other organic solvents comprise dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, and a phosphate or a combination thereof.

Although a lithium ion battery is exemplified above, after reading this application, those skilled in the art will understand that the separator of the present application can be used in other suitable electrochemical devices. Such electrochemical devices comprise any device in which an electrochemical reaction takes place, and specific examples comprise all kinds of primary batteries, secondary batteries, fuel cells, solar cells, or capacitors. In various examples of the present application, the electrochemical device may be a battery such as a lead acid battery, a nickel-cadmium battery, a nickel-hydrogen battery, a lithium ion battery, or the like. In particular, the electrochemical device is a lithium secondary battery comprising a lithium metal battery, a lithium ion battery, a lithium polymer battery or a lithium ion polymer battery.

Hereinafter, a lithium ion battery is taken as an example and the preparation of a lithium ion battery is described in conjunction with specific embodiments. Those skilled in the art will understand that the preparation methods described in the present application are merely exemplary, and any other suitable preparation methods also fall within the protection scope of the present application.

EXAMPLES

The performance evaluation of the lithium ion batteries in the examples and comparative examples of the present application is described below.

1. Preparation of Lithium Ion Battery (1) Preparation of Cathode

The cathode active material lithium cobalt oxide (LiCoO$_2$), the binder polyvinylidene fluoride (PVDF), and the conductive agent conductive carbon black (Super P) were dissolved at a weight ratio of 94:3:3 in the solvent N-methylpyrrolidone (NMP). The mixture was uniformly stirred to form a cathode slurry, and then the cathode slurry was uniformly coated on both surfaces of an aluminum foil that was a cathode current collector, dried at 85° C., to obtain a cathode active material layer. After cold pressing, slitting, cutting, and welding a cathode tab, a cathode was obtained.

(2) Preparation of Anode

The anode active material artificial graphite, the binder styrene-butadiene rubber, and the conductive agent conductive carbon black (Super P) were mixed at a weight ratio of 92:3:5 uniformly with deionized water to form an anode slurry. Then the anode slurry was uniformly coated on both surfaces of a copper foil that is an anode current collector, and then dried at 85° C. to form an anode active material layer. After cold pressing, slitting, cutting, and welding an anode tab, an anode was obtained.

(3) Preparation of Porous Substrate

A PE powder with a molecular weight of 1,000,000 was mixed with paraffin oil at a weight ratio of 1:4, extruded at a high temperature and casted to form a film. The film was stretched in the longitudinal and transverse directions. The paraffin oil in the film was extracted with dichloromethane, and a porous substrate was obtained after drying and heat setting. By adjusting the stretching ratio in the longitudinal and transverse directions (stretching ratio), various porous substrates with different plastic deformation rates were obtained.

(4) Preparation of Porous Layer on a Surface of the Porous Substrate

Alumina and polyacrylonitrile were added at a weight ratio of 91:9 to deionized water and mixed uniformly to form a slurry having a solid content of 45%. Then the slurry was uniformly coated on one side of the porous substrate by gravure coating to obtain a wet film. After the wet film was dried in an oven, the separator of the present application was obtained.

(5) Preparation of Binder Layer on a Surface of the Separator

PVDF and polyacrylonitrile were uniformly mixed at a weight ratio of 9:1 with deionized water, to give a slurry having a final solid content of 10% to 15%. Then the slurry was sprayed onto both sides of the separator prepared in Step (4). After drying in an oven, the final separator was obtained.

(6) Preparation of Electrolyte Solution

Under a dry argon atmosphere, LiPF$_6$ was dissolved in a mixed non-aqueous solvent composed of 30 wt % of ethylene carbonate (EC), 40 wt % of ethyl methyl carbonate (EMC), and 30 wt % of diethyl carbonate (DEC) to give a concentration of 1.2 M. 1 wt % of ethylene carbonate and 5 wt % of fluoroethylene carbonate were added to obtain an electrolytic solution.

(7) Preparation of Lithium Ion Battery

A cathode, the separator obtained in Step (5) and an anode were wound, to obtain an electrode assembly. The electrode assembly was placed in a package housing, and then the liquid electrolyte was injected and packaged. After formation, evacuation, and shaping, a lithium ion battery was formed.

2. Test Methods (1) Test Method for the Plastic Deformation Rate of the Porous Substrate The porous substrate was cut into strips having a size of 100 mm×20 mm along the first direction and the second direction. A region having a length of L0=40 mm was arbitrarily selected in the range of 100 mm in the length direction of the strip, and marklines were made at two ends of the region. An area between the marklines was stretched to break by a high-speed universal tensile testing machine at a speed of 50 mm/min. The maximum length L1 reached by the stretching was recorded, and then the broken porous substrate was docked along the fracture and flattened to test the length L2 in a natural state. The absolute plastic deformation rate ε1 and the relative plastic deformation rate ε2 of the porous substrate in a certain direction were calculated by the following formula:

$$\varepsilon 1=(L2-L0)/L0\times 100\%$$

$$\varepsilon 2=(L2-L0)/(L1-L0)\times 100\%.$$

(2) Test Method for the Thickness of the Porous Substrate

A length of the porous substrate sample was selected. 10 measurements of the thickness of the porous substrate sample were made in an area of 5000 mm$^2$ by a 1/10000 thickness gauge, and averaged to obtain a value that was the thickness of the porous substrate.

(3) Test Method for the Porosity of the Porous Substrate 10 porous substrate samples having a size of 50 mm×100 mm were cut, and then the 10 porous substrates were placed in a true porosity tester (Model AccuPycII1340) to test the porosity of the porous substrates. The true volumes Vol of the porous substrate samples were determined, and then the thickness T of the 10 porous substrate samples were determined by using a 1/10000 thickness gauge. The apparent volume of the porous substrate was calculated according to the formula: Vol$_0$=50×100×T, then the porosity of the separator was calculated by the formula: porosity=(Vol$_0$−Vol)/Vol$_0$×100%.

(4) Nail Penetration Test of Lithium Ion Battery

The lithium ion battery was placed in an incubator at 25° C. and stood for 30 minutes to allow the lithium ion battery to reach a constant temperature. The lithium ion battery reaching the constant temperature was charged at a constant current of 0.5 C to a voltage of 4.4 V, and then charged at a constant voltage of 4.4 V until the current reached 0.025 C. The fully charged lithium ion battery was transferred to a nail penetration tester. The ambient test temperature was maintained at 25° C.±2° C., and a steel nail with a diameter of 4 mm was pierced evenly through the center of the lithium ion battery at a speed of 30 mm/s and maintained for 300 s therein. If the lithium ion battery did not smoke, did not catch fire, and did not explode, passing was recorded. Each time 10 lithium ion batteries were tested, and the number of lithium ion batteries that pass the nail test was used as an indicator to evaluate the safety performance of lithium ion batteries.

Conventional lithium ion batteries (Comparative Examples 1-6) and lithium ion batteries according to the embodiments of the present application (Examples 1-40) were prepared and tested according to the above methods. The porous substrates used in the lithium ion batteries of the comparative examples and examples were prepared under the following conditions to have the following plastic deformation rate.

Comparative Example 1

The porous substrate had a thickness of 7 μm and a porosity of 30%, had no porous layer disposed on the surface, and had a stretching ratio in the longitudinal direction of 7.0 and a stretching ratio in the transverse direction of 7.0. The obtained porous substrate had an absolute plastic deformation rate in a first direction of 29%, an absolute plastic deformation rate in a second direction of 36%, a relative plastic deformation rate in the first direction of 66%, and a relative plastic deformation rate in the second direction of 73%.

Comparative Example 2

The porous substrate had a thickness of 7 μm and a porosity of 31%, had no porous layer disposed on the surface, and had a stretching ratio in the longitudinal direction of 7.0 and a stretching ratio in the transverse direction of 6.8. The obtained porous substrate had an absolute plastic deformation rate in a first direction of 35%, an absolute plastic deformation rate in a second direction of 52%, a relative plastic deformation rate in the first direction of 57%, and a relative plastic deformation rate in the second direction of 76%.

Comparative Example 3

The porous substrate had a thickness of 7 μm and a porosity of 30%. The binder of the porous layer disposed on a surface of the porous substrate was polyacrylonitrile, the inorganic particles were $Al_2O_3$, and the inorganic particles were 91% by weight of the porous layer. During preparation, the porous substrate had a stretching ratio in the longitudinal direction of 7.0 and a stretching ratio in the transverse direction of 6.8. The obtained porous substrate had an absolute plastic deformation rate in a first direction of 31%, an absolute plastic deformation rate in a second direction of 47%, a relative plastic deformation rate in the first direction of 67%, and a relative plastic deformation rate in the second direction of 75%.

Comparative Example 4

The porous substrate had a thickness of 20 μm and a porosity of 30%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 7.0 and a stretching ratio in the transverse direction of 7.0. The obtained porous substrate had an absolute plastic deformation rate in a first direction of 30%, an absolute plastic deformation rate in a second direction of 51%, a relative plastic deformation rate in the first direction of 56%, and a relative plastic deformation rate in the second direction of 66%.

Comparative Example 5

The porous substrate had a thickness of 7 μm and a porosity of 15%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 7.0 and a stretching ratio in the transverse direction of 7.0. The obtained porous substrate had an absolute plastic deformation rate in a first direction of 33%, an absolute plastic deformation rate in a second direction of 50%, a relative plastic deformation rate in the first direction of 52%, and a relative plastic deformation rate in the second direction of 60%.

Comparative Example 6

The porous substrate had a thickness of 7 μm and a porosity of 31%. The binder of the porous layer disposed on a surface of the porous substrate was polyacrylonitrile, the inorganic particles were boehmite, and the inorganic particles were 91% by weight of the porous layer. The porous substrate had a stretching ratio in the longitudinal direction of 7.0 and a stretching ratio in the transverse direction of 7.0. The obtained porous substrate had an absolute plastic deformation rate in a first direction of 36%, an absolute plastic deformation rate in a second direction of 55%, a relative plastic deformation rate in the first direction of 61%, and a relative plastic deformation rate in the second direction of 77%.

Example 1

The porous substrate had a thickness of 7 μm and a porosity of 24%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 2.6 and a stretching ratio in the transverse direction of 6.5. The obtained porous substrate had an absolute plastic deformation rate in a first direction of 1600%, an absolute plastic deformation rate in a second direction of 68%, a relative plastic deformation rate in the first direction of 90%, and a relative plastic deformation rate in the second direction of 70%.

Example 2

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 3.2 and a stretching ratio in the transverse direction of 6.5. The obtained porous substrate had an absolute plastic deformation rate in a first direction of 1200%, an absolute plastic deformation rate in a second direction of 67%, a relative plastic deformation rate in the first direction of 90%, and a relative plastic deformation rate in the second direction of 72%.

Example 3

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 4.5 and a stretching ratio in the transverse direction of 6.5. The obtained porous substrate had an absolute plastic deformation rate in a first direction of 800%, an absolute plastic deformation rate in a second direction of 68%, a relative plastic deformation rate in the first direction of 89%, and a relative plastic deformation rate in the second direction of 71%.

Example 4

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.2 and a stretching ratio in the transverse direction of 6.8. The obtained porous substrate had an absolute plastic deformation rate in a first direction of 676%, an absolute plastic deformation rate in a second direction of 69%, a relative plastic deformation rate in the first direction of 83%, and a relative plastic deformation rate in the second direction of 73%.

Example 5

The porous substrate had a thickness of 7 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.8 and a stretching ratio in the transverse direction of 6.8. The obtained porous substrate had an absolute plastic deformation rate in a first direction of 456%, an absolute plastic deformation rate in a second direction of 70%, a relative plastic deformation rate in the first direction of 80%, and a relative plastic deformation rate in the second direction of 72%.

Example 6

The porous substrate had a thickness of 7 μm and a porosity of 30%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 70%, a relative plastic deformation rate in the first direction of 76%, and a relative plastic deformation rate in the second direction of 75%.

Example 7

The porous substrate had a thickness of 7 μm and a porosity of 31%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 6.8. The obtained porous substrate had an absolute plastic deformation rate in a first direction of 97%, an absolute plastic deformation rate in a second direction of 69%, a relative plastic deformation rate in the first direction of 67%, and a relative plastic deformation rate in the second direction of 77%.

Example 8

The porous substrate had a thickness of 7 μm and a porosity of 31%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.6 and a stretching ratio in the transverse direction of 6.8. The obtained porous substrate had an absolute plastic deformation rate in a first direction of 40%, an absolute plastic deformation rate in a second direction of 68%, a relative plastic deformation rate in the first direction of 66%, and a relative plastic deformation rate in the second direction of 74%.

Example 9

The porous substrate had a thickness of 7 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.5 and a stretching ratio in the transverse direction of 2.5. The obtained porous substrate had an absolute plastic deformation rate in a first direction of 235%, an absolute plastic deformation rate in a second direction of 1600%, a relative plastic deformation rate in the first direction of 77%, and a relative plastic deformation rate in the second direction of 90%.

Example 10

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.5 and a stretching ratio in the transverse direction of 3.0. The obtained porous substrate had an absolute plastic deformation rate in a first direction of 232%, an absolute plastic deformation rate in a second direction of 1200%, a relative plastic deformation rate in the first direction of 75%, and a relative plastic deformation rate in the second direction of 90%.

Example 11

The porous substrate had a thickness of 7 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.5 and a stretching ratio in the transverse direction of 4.5. The obtained porous substrate had an absolute plastic deformation rate in a first direction of 243%, an absolute plastic deformation rate in a second direction of 800%, a relative plastic deformation rate in the first direction of 77%, and a relative plastic deformation rate in the second direction of 88%.

Example 12

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.6 and a stretching ratio in the transverse direction of 5.0. The obtained porous substrate had an absolute plastic deformation rate in a first direction of 235%, an absolute plastic deformation rate in a second direction of 687%, a relative plastic deformation rate in the first direction of 76%, and a relative plastic deformation rate in the second direction of 85%.

Example 13

The porous substrate had a thickness of 7 μm and a porosity of 26%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.5 and a stretching ratio in the transverse direction of 5.2. The obtained porous substrate had an absolute plastic deformation rate in a first direction of 220%, an absolute plastic deformation rate in a second direction of 502%, a relative plastic deformation rate in the first direction of 75%, and a relative plastic deformation rate in the second direction of 85%.

Example 14

The porous substrate had a thickness of 7 μm and a porosity of 29%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.8 and a stretching ratio in the transverse direction of 5.8. The obtained porous substrate had an absolute plastic deformation rate in a first direction of 217%, an absolute plastic deformation rate in a second direction of 297%, a relative plastic deformation rate in the first direction of 75%, and a relative plastic deformation rate in the second direction of 82%.

Example 15

The porous substrate had a thickness of 7 μm and a porosity of 30%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.2. The obtained porous substrate had an absolute plastic deformation rate in a first direction of 228%, an absolute plastic deformation rate in a second direction of 163%, a relative plastic deformation rate in the first direction of 74%, and a relative plastic deformation rate in the second direction of 78%.

Example 16

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 6.8. The obtained porous substrate had an absolute plastic deformation rate in a first direction of 183%, an absolute plastic deformation rate in a second direction of 79%, a relative plastic deformation rate in the first direction of 65%, and a relative plastic deformation rate in the second direction of 75%.

Example 17

The porous substrate had a thickness of 7 μm and a porosity of 24%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.6. The obtained porous substrate had an absolute plastic deformation rate in a first direction of 210%, an absolute plastic deformation rate in a second direction of 76%, a relative plastic deformation rate in the first direction of 71%, and a relative plastic deformation rate in the second direction of 75%.

Example 18

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.6 and a stretching ratio in the transverse direction of 6.8. The obtained porous substrate had an absolute plastic deformation rate in a first direction of 430%, an absolute plastic deformation rate in a second direction of 75%, a relative plastic deformation rate in the first direction of 80%, and a relative plastic deformation rate in the second direction of 73%.

Example 19

The porous substrate had a thickness of 7 μm and a porosity of 24%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.2 and a stretching ratio in the transverse direction of 6.6. The obtained porous substrate had an absolute plastic deformation rate in a first direction of 550%, an absolute plastic deformation rate in a second direction of 87%, a relative plastic deformation rate in the first direction of 86%, and a relative plastic deformation rate in the second direction of 75%.

Example 20

The porous substrate had a thickness of 7 μm and a porosity of 23%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.0 and a stretching ratio in the transverse direction of 6.8. The obtained porous substrate had an absolute plastic deformation rate in a first direction of 594%, an absolute plastic deformation rate in a second direction of 85%, a relative plastic deformation rate in the first direction of 90%, and a relative plastic deformation rate in the second direction of 74%.

Example 21

The porous substrate had a thickness of 7 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.4. The obtained porous substrate had an absolute plastic deformation rate in a first direction of 220%, an absolute plastic deformation rate in a second direction of 92%, a relative plastic deformation rate in the first direction of 73%, and a relative plastic deformation rate in the second direction of 78%.

Example 22

The porous substrate had a thickness of 7 μm and a porosity of 26%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.0. The obtained porous substrate had an absolute plastic deformation rate in a first direction of 198%, an absolute plastic deformation rate in a second direction of 210%, a relative plastic deformation rate in the first direction of 70%, and a relative plastic deformation rate in the second direction of 82%.

Example 23

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.8 and a stretching ratio in the transverse direction of 5.6. The obtained porous substrate had an absolute plastic deformation rate in a first direction of 218%, an absolute plastic deformation rate in a second direction of 358%, a relative plastic deformation rate in the first direction of 73%, and a relative plastic deformation rate in the second direction of 84%.

Example 24

The porous substrate had a thickness of 7 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.8 and a stretching ratio in the transverse direction of 5.2. The obtained porous substrate had an absolute plastic deformation rate in a first direction of 239%, an absolute plastic deformation rate in a second direction of 398%, a relative plastic deformation rate in the first direction of 75%, and a relative plastic deformation rate in the second direction of 87%.

Example 25

The porous substrate had a thickness of 7 μm and a porosity of 26%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 5.8 and a stretching ratio in the transverse direction of 5.0. The obtained porous substrate had an absolute plastic deformation rate in a first direction of 240%, an absolute plastic deformation rate in a second direction of 470%, a relative plastic deformation rate in the first direction of 77%, and a relative plastic deformation rate in the second direction of 90%.

Example 26

The porous substrate had a thickness of 1 μm and a porosity of 26%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.4 and a stretching ratio in the transverse direction of 6.8. The obtained porous substrate had an absolute plastic deformation rate in a first direction of 150%, an absolute plastic deformation rate in a second direction of 70%, a relative plastic deformation rate in the first direction of 68%, and a relative plastic deformation rate in the second direction of 76%.

Example 27

The porous substrate had a thickness of 3 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 6.6. The obtained porous substrate had an absolute plastic deformation rate in a first direction of 181%, an absolute plastic deformation rate in a second direction of 75%, a relative plastic deformation rate in the first direction of 67%, and a relative plastic deformation rate in the second direction of 77%.

Example 28

The porous substrate had a thickness of 9 μm and a porosity of 27%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.6. The obtained porous substrate had an absolute plastic deformation rate in a first direction of 210%, an absolute plastic deformation rate in a second direction of 82%, a relative plastic deformation rate in the first direction of 73%, and a relative plastic deformation rate in the second direction of 76%.

Example 29

The porous substrate had a thickness of 12 μm and a porosity of 24%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.4. The obtained porous substrate had an absolute plastic deformation rate in a first direction of 233%, an absolute plastic deformation rate in a second direction of 89%, a relative plastic deformation rate in the first direction of 75%, and a relative plastic deformation rate in the second direction of 76%.

Example 30

The porous substrate had a thickness of 16 μm and a porosity of 25%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 6.4. The obtained porous substrate had an absolute plastic deformation rate in a first direction of 228%, an absolute plastic deformation rate in a second direction of 91%, a relative plastic deformation rate in the first direction of 75%, and a relative plastic deformation rate in the second direction of 77%.

Example 31

The porous substrate had a thickness of 20 μm and a porosity of 23%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.4. The obtained porous substrate had an absolute plastic deformation rate in a first direction of 231%, an absolute plastic deformation rate in a second direction of 89%, a relative plastic deformation rate in the first direction of 76%, and a relative plastic deformation rate in the second direction of 75%.

Example 32

The porous substrate had a thickness of 40 μm and a porosity of 23%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.6. The obtained porous substrate had an absolute plastic deformation rate in a first direction of 247%, an absolute plastic deformation rate in a second direction of 93%, a relative plastic deformation rate in the first direction of 75%, and a relative plastic deformation rate in the second direction of 76%.

Example 33

The porous substrate had a thickness of 7 μm and a porosity of 15%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.0 and a stretching ratio in the transverse direction of 6.4. The obtained porous substrate had an absolute plastic deformation rate in a first direction of 257%, an absolute plastic deformation rate in a second direction of 82%, a relative plastic deformation rate in the first direction of 77%, and a relative plastic deformation rate in the second direction of 77%.

Example 34

The porous substrate had a thickness of 7 μm and a porosity of 46%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 6.8. The obtained porous substrate had an absolute plastic deformation rate in a first direction of 219%, an absolute plastic deformation rate in a second direction of 76%, a relative plastic deformation rate in the first direction of 73%, and a relative plastic deformation rate in the second direction of 76%.

Example 35

The porous substrate had a thickness of 7 μm and a porosity of 60%. The binder of the porous layer disposed on a surface of the porous substrate was polyacrylonitrile, the inorganic particles were $Al_2O_3$, and the inorganic particles were 91% by weight of the porous layer. The porous substrate had a stretching ratio in the longitudinal direction of 6.2 and a stretching ratio in the transverse direction of 7.0. The obtained porous substrate had an absolute plastic deformation rate in a first direction of 228%, an absolute plastic deformation rate in a second direction of 83%, a relative plastic deformation rate in the first direction of 73%, and a relative plastic deformation rate in the second direction of 76%.

Example 36

The porous substrate had a thickness of 7 μm and a porosity of 30%. The binder of the porous layer disposed on a surface of the porous substrate was polyacrylonitrile, the inorganic particles were boehmite, and the inorganic particles were 85% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 86%, a relative plastic deformation rate in the first direction of 76%, and a relative plastic deformation rate in the second direction of 75%.

Example 37

The porous substrate had a thickness of 7 μm and a porosity of 30%. The binder of the porous layer disposed on a surface of the porous substrate was polymethyl methacrylate, the inorganic particles were $Al_2O_3$, and the inorganic particles were 70% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 86%, a relative plastic deformation rate in the first direction of 76%, and a relative plastic deformation rate in the second direction of 75%.

Example 38

The porous substrate had a thickness of 7 μm and a porosity of 30%. The binder of the porous layer disposed on a surface of the porous substrate was polyvinylidene fluoride, the inorganic particles were $Al_2O_3$, and the inorganic particles were 70% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 86%, a relative plastic deformation rate in the first direction of 76%, and a relative plastic deformation rate in the second direction of 75%.

Example 39

The porous substrate had a thickness of 7 μm and a porosity of 30%. The binder of the porous layer disposed on a surface of the porous substrate was polyacrylonitrile, the inorganic particles were magnesium hydroxide, and the inorganic particles were 91% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 86%, a relative plastic deformation rate in the first direction of 76%, and a relative plastic deformation rate in the second direction of 75%.

Example 40

The porous substrate had a thickness of 7 μm and a porosity of 30%. The binder of the porous layer disposed on a surface of the porous substrate was polyacrylonitrile, the inorganic particles were $Al_2O_3$, and the inorganic particles were 70% by weight of the porous layer. The porous substrate had a stretching ratio in the longitudinal direction of 6.0 and a stretching ratio in the transverse direction of 6.8. The obtained porous substrate had an absolute plastic deformation rate in a first direction of 231%, an absolute plastic deformation rate in a second direction of 86%, a relative plastic deformation rate in the first direction of 76%, and a relative plastic deformation rate in the second direction of 75%.

Table 1 shows the variable settings and test results for each of the comparative examples and examples.

The porous substrate of the separator of Comparative Examples 1 and 2 had no porous layer. The porous substrate of the separator of Comparative Examples 3-6 had a porous layer on the surface, but the absolute plastic deformation rate did not satisfy the requisite of about 40% to about 1800%. Comparative Examples 4 and 5 show that even if the separator is thick and the porosity is low, if the absolute plastic deformation rate does not satisfy the requisite of about 40% to about 1800%, the nail penetration test passing rate is still low.

As shown by the data in the sections of "Absolute plastic deformation rate in first direction" (i.e., Examples 1-8) and "Absolute plastic deformation rate in second direction" (i.e., Examples 6 and 9-15) in Table 1, the greater the absolute plastic deformation rate in the first direction (e.g. the longitudinal direction) or the second direction (e.g. the transverse direction) is, the higher the nail penetration test passing test will be. Compared with Comparative Example 3, the absolute plastic deformation rate in the first direction or the second direction has a significant influence on the nail penetration test passing rate.

As shown by the data in the sections of "Relative plastic deformation rate in first direction" (i.e., Examples 6 and 16-20) and "Relative plastic deformation rate in second direction" (i.e., Examples 6 and 21-25) in Table 1, the relative plastic deformation rate in the first direction or the second direction is correlated with the absolute plastic deformation rate in the first direction or the second direction, and its influence on the nail penetration test passing rate complies with that of the absolute plastic deformation rate on the nail penetration test passing rate.

As shown by the data in the section of "Thickness of porous substrate" (i.e., Examples 6 and 26-32) in Table 1, the thicker the porous substrate of the separator is, the higher the nail penetration test passing rate will be when the absolute plastic deformation rate satisfies the requisite. Compared with Comparative Example 4, when the absolute plastic deformation rate does not satisfy the requisite of about 40% to about 1800%, even if the thickness is large, there is no way to effectively improve the nail penetration test passing rate.

As shown by the data in the section of "Porosity of porous substrate" (i.e., Examples 6 and 26-32) in Table 1, the lower the porosity of the porous substrate of the separator is, the higher the nail penetration test passing rate will be when the absolute plastic deformation rate satisfies the requisite. However, compared with Comparative Example 5, when the absolute plastic deformation rate does not satisfy the requisite of about 40% to about 1800%, even if the porosity is low, there is no way to effectively improve the nail penetration test passing rate.

As shown by the data in the section of "Porous layer" (i.e., Examples 6 and 36-40) in Table 1, different types of porous layers have no significant influence on the nail penetration test passing rate. Compared with Comparative Examples 3 and 6, when the absolute plastic deformation rate does not satisfy the requisite of about 40% to about 1800%, the structure of the porous layer does not have a substantial influence on the nail penetration test passing rate.

References throughout the specification to "embodiments," "partial embodiments," "one embodiment," "another example," "example," "specific example" or "partial examples" mean that at least one embodiment or example of the application comprises specific features, structures, materials or characteristics described in the embodiments or examples. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present application, and modifications, substitutions and changes can be made to the embodiments without departing from the spirit and scope of the present application.

TABLE 1

| | | Parameters in examples and comparative examples | | | | |
|---|---|---|---|---|---|---|
| Variable setting | Example | Absolute plastic deformation rate in the first direction | Absolute plastic deformation rate in the second direction | Relative plastic deformation rate in the first direction | Relative plastic deformation rate in the second direction | Thickness of porous substrate (μm) |
| Absolute plastic deformation rate in the first direction | 1 | 1600% | 68% | 90% | 70% | 7 |
| | 2 | 1200% | 67% | 90% | 72% | 7 |
| | 3 | 800% | 68% | 89% | 71% | 7 |
| | 4 | 676% | 69% | 83% | 73% | 7 |
| | 5 | 456% | 70% | 80% | 72% | 7 |
| | 6 | 231% | 70% | 76% | 75% | 7 |
| | 7 | 97% | 69% | 67% | 77% | 7 |
| | 8 | 40% | 68% | 66% | 74% | 7 |
| Absolute plastic deformation rate in the second direction | 9 | 235% | 1600% | 77% | 90% | 7 |
| | 10 | 232% | 1200% | 75% | 90% | 7 |
| | 11 | 243% | 800% | 77% | 88% | 7 |
| | 12 | 235% | 687% | 76% | 85% | 7 |
| | 13 | 220% | 502% | 75% | 85% | 7 |
| | 14 | 217% | 297% | 75% | 82% | 7 |
| | 15 | 228% | 163% | 74% | 78% | 7 |
| | 6 | 231% | 70% | 76% | 75% | 7 |
| Relative plastic deformation rate in the first direction | 16 | 183% | 79% | 65% | 75% | 7 |
| | 17 | 210% | 76% | 71% | 75% | 7 |
| | 6 | 231% | 70% | 76% | 75% | 7 |
| | 18 | 430% | 75% | 80% | 73% | 7 |
| | 19 | 550% | 87% | 86% | 75% | 7 |
| | 20 | 594% | 85% | 90% | 74% | 7 |
| Relative plastic deformation rate in the second direction | 6 | 231% | 70% | 76% | 75% | 7 |
| | 21 | 220% | 92% | 73% | 78% | 7 |
| | 22 | 198% | 210% | 70% | 82% | 7 |
| | 23 | 218% | 358% | 73% | 84% | 7 |
| | 24 | 239% | 398% | 75% | 87% | 7 |
| | 25 | 240% | 470% | 77% | 90% | 7 |
| Thickness of Porous substrate | 26 | 150% | 70% | 68% | 76% | 1 |
| | 27 | 181% | 75% | 67% | 77% | 3 |
| | 6 | 231% | 70% | 76% | 75% | 7 |
| | 28 | 210% | 82% | 73% | 76% | 9 |
| | 29 | 233% | 89% | 75% | 76% | 12 |
| | 30 | 228% | 91% | 75% | 77% | 16 |
| | 31 | 231% | 89% | 76% | 75% | 20 |
| | 32 | 247% | 93% | 75% | 76% | 40 |
| Porosity of porous substrate | 33 | 257% | 82% | 77% | 77% | 7 |
| | 6 | 231% | 70% | 76% | 75% | 7 |
| | 34 | 219% | 76% | 73% | 76% | 7 |
| | 35 | 228% | 83% | 73% | 76% | 7 |
| Porous layer | 6 | 231% | 70% | 76% | 75% | 7 |
| | 36 | 231% | 86% | 76% | 75% | 7 |
| | 37 | 231% | 86% | 76% | 75% | 7 |
| | 38 | 231% | 86% | 76% | 75% | 7 |
| | 39 | 231% | 86% | 76% | 75% | 7 |
| | 40 | 231% | 86% | 76% | 75% | 7 |
| Comparative Example | 1 | 29% | 36% | 66% | 73% | 7 |
| | 2 | 35% | 52% | 57% | 76% | 7 |
| | 3 | 31% | 47% | 67% | 75% | 7 |
| | 4 | 30% | 51% | 56% | 66% | 20 |
| | 5 | 33% | 50% | 52% | 60% | 7 |
| | 6 | 36% | 55% | 61% | 77% | 7 |

TABLE 1-continued

| Variable setting | Porosity of porous substrate | Binder in porous layer | Inorganic particles in porous layer | Nail penetration test passing rate % |
|---|---|---|---|---|
| Absolute plastic deformation rate in the first direction | 24% | Polyacrylonitrile | $Al_2O_3$ (91 wt %) | 100% |
| | 25% | Polyacrylonitrile | $Al_2O_3$ (91 wt %) | 100% |
| | 25% | Polyacrylonitrile | $Al_2O_3$ (91 wt %) | 90% |
| | 25% | Polyacrylonitrile | $Al_2O_3$ (91 wt %) | 80% |
| | 27% | Polyacrylonitrile | $Al_2O_3$ (91 wt %) | 70% |
| | 30% | Polyacrylonitrile | $Al_2O_3$ (91 wt %) | 70% |
| | 31% | Polyacrylonitrile | $Al_2O_3$ (91 wt %) | 60% |
| | 31% | Polyacrylonitrile | $Al_2O_3$ (91 wt %) | 50% |
| Absolute plastic deformation rate in the second direction | 27% | Polyacrylonitrile | $Al_2O_3$ (91 wt %) | 100% |
| | 25% | Polyacrylonitrile | $Al_2O_3$ (91 wt %) | 100% |
| | 27% | Polyacrylonitrile | $Al_2O_3$ (91 wt %) | 100% |
| | 25% | Polyacrylonitrile | $Al_2O_3$ (91 wt %) | 90% |
| | 26% | Polyacrylonitrile | $Al_2O_3$ (91 wt %) | 90% |
| | 29% | Polyacrylonitrile | $Al_2O_3$ (91 wt %) | 80% |
| | 30% | Polyacrylonitrile | $Al_2O_3$ (91 wt %) | 70% |
| | 30% | Polyacrylonitrile | $Al_2O_3$ (91 wt %) | 70% |
| Relative plastic deformation rate in the first direction | 25% | Polyacrylonitrile | $Al_2O_3$ (91 wt %) | 50% |
| | 24% | Polyacrylonitrile | $Al_2O_3$ (91 wt %) | 60% |
| | 30% | Polyacrylonitrile | $Al_2O_3$ (91 wt %) | 70% |
| | 25% | Polyacrylonitrile | $Al_2O_3$ (91 wt %) | 80% |
| | 24% | Polyacrylonitrile | $Al_2O_3$ (91 wt %) | 90% |
| | 23% | Polyacrylonitrile | $Al_2O_3$ (91 wt %) | 90% |
| Relative plastic deformation rate in the second direction | 30% | Polyacrylonitrile | $Al_2O_3$ (91 wt %) | 70% |
| | 27% | Polyacrylonitrile | $Al_2O_3$ (91 wt %) | 70% |
| | 26% | Polyacrylonitrile | $Al_2O_3$ (91 wt %) | 80% |
| | 25% | Polyacrylonitrile | $Al_2O_3$ (91 wt %) | 80% |
| | 25% | Polyacrylonitrile | $Al_2O_3$ (91 wt %) | 90% |
| | 26% | Polyacrylonitrile | $Al_2O_3$ (91 wt %) | 90% |
| Thickness of Porous substrate | 26% | Polyacrylonitrile | $Al_2O_3$ (91 wt %) | 30% |
| | 27% | Polyacrylonitrile | $Al_2O_3$ (91 wt %) | 50% |
| | 30% | Polyacrylonitrile | $Al_2O_3$ (91 wt %) | 70% |
| | 27% | Polyacrylonitrile | $Al_2O_3$ (91 wt %) | 80% |
| | 24% | Polyacrylonitrile | $Al_2O_3$ (91 wt %) | 80% |
| | 25% | Polyacrylonitrile | $Al_2O_3$ (91 wt %) | 90% |
| | 23% | Polyacrylonitrile | $Al_2O_3$ (91 wt %) | 100% |
| | 23% | Polyacrylonitrile | $Al_2O_3$ (91 wt %) | 100% |
| Porosity of porous substrate | 15% | Polyacrylonitrile | $Al_2O_3$ (91 wt %) | 80% |
| | 30% | Polyacrylonitrile | $Al_2O_3$ (91 wt %) | 70% |
| | 46% | Polyacrylonitrile | $Al_2O_3$ (91 wt %) | 60% |
| | 60% | Polyacrylonitrile | $Al_2O_3$ (91 wt %) | 50% |
| Porous layer | 30% | Polyacrylonitrile | $Al_2O_3$ (91 wt %) | 70% |
| | 30% | Polyacrylonitrile | Boehmite (85 wt %) | 80% |
| | 30% | Polymethyl methacrylate | $Al_2O_3$ (70 wt %) | 60% |
| | 30% | Polyvinylidene fluoride | $Al_2O_3$ (70 wt %) | 60% |
| | 30% | Polyacrylonitrile | Magnesium hydroxide (91 wt %) | 70% |
| | 30% | Polyacrylonitrile | $Al_2O_3$ (70 wt %) | 60% |
| Comparative Example | 30% | / | / | 0% |
| | 31% | / | / | 0% |
| | 30% | Polyacrylonitrile | $Al_2O_3$ (91 wt %) | 10% |
| | 30% | Polyacrylonitrile | $Al_2O_3$ (91 wt %) | 10% |
| | 15% | Polyacrylonitrile | $Al_2O_3$ (91 wt %) | 10% |
| | 31% | Polyacrylonitrile | Boehmite (91 wt %) | 10% |

What is claimed is:

1. A separator, comprising:
   a porous substrate; and
   a porous layer;
   wherein the porous layer is disposed on a surface of the porous substrate and comprises inorganic particles and a binder; and the porous substrate has an absolute plastic deformation rate in a first direction ranging from 40% to 1800%;
   wherein the absolute plastic deformation rate is defined according to an equation (L2−L0)/L0×100%, where L0 represents a length of the porous substrate before stretching and L2 represents a length of the porous substrate after the porous substrate is stretched to breakage and docked along a fracture caused by the breakage and flattened.

2. The separator according to claim 1, wherein the porous substrate has an absolute plastic deformation rate in a second direction ranging from 60% to 1800%.

3. The separator according to claim 1, wherein the porous substrate has at least one of the following properties:
   an absolute plastic deformation rate in the first direction ranging from 40% to 1600%; and
   an absolute plastic deformation rate in the second direction ranging from 70% to 1600%.

4. The separator according to claim 1, wherein the porous substrate has at least one of the following properties:
a relative plastic deformation rate in the first direction ranging from 50% to 100%; and
a relative plastic deformation rate in the second direction ranging from 60% to 100%.

5. The separator according to claim 4, wherein the porous substrate has at least one of the following properties:
a relative plastic deformation rate in the first direction ranging from 65% to 90%; and
a relative plastic deformation rate in the second direction ranging from 75% to 90%.

6. The separator according to claim 1, wherein the binder comprises at least one selected from the group consisting of a vinylidene fluoride-hexafluoropropylene copolymer, a vinylidene fluoride-trichloroethylene copolymer, polymethyl methacrylate, polyacrylic acid, polyacrylate, polyacrylonitrile, polyvinyl pyrrolidone, polyvinyl acetate, an ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, an acrylonitrile-styrene-butadiene copolymer, polyvinyl alcohol, polyvinyl ether, polytetrafluoroethylene, polyhexafluoropropylene, a styrene-butadiene copolymer, and polyvinylidene fluoride.

7. The separator according to claim 1, wherein the inorganic particles comprise at least one selected from the group consisting of alumina, silica, magnesia, titanium oxide, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate.

8. The separator according to claim 1, wherein the porous substrate comprises a polymer film, a multilayer polymer film or a nonwoven fabric; wherein the polymer film, the multilayer polymer film or the nonwoven fabric is formed by any one or more of the following polymers: polyethylene, polypropylene, polyethylene terephthalate, polybutylene terephthalate, polyphenylene terephthamide, polyester, polyacetal, polyamide, polycarbonate, polyimide, polyetheretherketone, polyaryletherketone, polyetherimide, polyamideimide, polybenzimidazole, polyethersulfone, polyphenylene ether, a cyclic olefin copolymer, polyphenylene sulfide or polyethylene naphthalene.

9. The separator according to claim 1, wherein the porous substrate has a thickness ranging from 1 to 40 μm.

10. The separator according to claim 1, wherein the porous substrate has a porosity ranging from 10% to 70%.

11. A separator, comprising:
a porous substrate; and
a porous layer;
wherein the porous layer is disposed on a surface of the porous substrate and comprises inorganic particles and a binder; and the porous substrate has an absolute plastic deformation rate in a first direction ranging from 40% to 1800%;
wherein the absolute plastic deformation rate is defined according to an equation $(L2-L0)/L0 \times 100\%$, where L0 represents a length of the porous substrate before stretching and L2 represents a length of the porous substrate after the porous substrate is stretched to breakage and docked along a fracture caused by the breakage and flattened; and
wherein the separator is configured to electrically isolate a cathode and an anode in an electrochemical device.

12. The separator according to claim 11, wherein the porous substrate has an absolute plastic deformation rate in a second direction ranging from 60% to 1800%.

13. The separator according to claim 11, wherein the porous substrate has at least one of the following properties:
an absolute plastic deformation rate in the first direction ranging from 40% to 1600%; and
an absolute plastic deformation rate in the second direction ranging from 70% to 1600%.

14. The separator according to claim 11, wherein the porous substrate has at least one of the following properties:
a relative plastic deformation rate in the first direction ranging from 50% to 100%; and
a relative plastic deformation rate in the second direction ranging from 60% to 100%.

15. The separator according to claim 14, wherein the porous substrate has at least one of the following properties:
a relative plastic deformation rate in the first direction ranging from 65% to 90%; and
a relative plastic deformation rate in the second direction ranging from 75% to 90%.

16. The separator according to claim 11, wherein the binder comprises at least one selected from the group consisting of a vinylidene fluoride-hexafluoropropylene copolymer, a vinylidene fluoride-trichloroethylene copolymer, polymethyl methacrylate, polyacrylic acid, polyacrylate, polyacrylonitrile, polyvinyl pyrrolidone, polyvinyl acetate, an ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, an acrylonitrile-styrene-butadiene copolymer, polyvinyl alcohol, polyvinyl ether, polytetrafluoroethylene, polyhexafluoropropylene, a styrene-butadiene copolymer, and polyvinylidene fluoride.

17. The separator according to claim 11, wherein the inorganic particles comprise at least one selected from the group consisting of alumina, silica, magnesia, titanium oxide, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate.

18. The separator according to claim 11, wherein the porous substrate comprises a polymer film, a multilayer polymer film or a nonwoven fabric; wherein the polymer film, the multilayer polymer film or the nonwoven fabric is formed by any one or more of the following polymers: polyethylene, polypropylene, polyethylene terephthalate, polybutylene terephthalate, polyphenylene terephthamide, polyester, polyacetal, polyamide, polycarbonate, polyimide, polyetheretherketone, polyaryletherketone, polyetherimide, polyamideimide, polybenzimidazole, polyethersulfone, polyphenylene ether, a cyclic olefin copolymer, polyphenylene sulfide or polyethylene naphthalene.

19. The separator according to claim 11, wherein the porous substrate has a thickness ranging from 1 to 40 μm.

20. The separator according to claim 11, wherein the porous substrate has a porosity ranging from 10% to 70%.

* * * * *